US008690125B1

(12) United States Patent
Brake

(10) Patent No.: US 8,690,125 B1
(45) Date of Patent: Apr. 8, 2014

(54) LASER EQUIPPED LIFT PAD DEVICE

(76) Inventor: Thomas S. Brake, Harrison, MI (US)

( * ) Notice: Subject to any disclaimer, the term of this patent is extended or adjusted under 35 U.S.C. 154(b) by 523 days.

(21) Appl. No.: 13/051,311

(22) Filed: Mar. 18, 2011

(51) Int. Cl.
*B66F 3/00* (2006.01)
*G01C 15/00* (2006.01)

(52) U.S. Cl.
USPC .......................................... 254/133 R; 33/286

(58) Field of Classification Search
USPC ....... 254/133 R, 93 HP; 33/286, 288, 203.14, 33/264; 362/486, 259, 89
See application file for complete search history.

(56) References Cited

U.S. PATENT DOCUMENTS

| | | | | |
|---|---|---|---|---|
| 3,854,820 | A | 12/1974 | Hansen | |
| 6,845,848 | B1 | 1/2005 | Kritzer | |
| 6,964,322 | B2 | 11/2005 | Green et al. | |
| D532,980 | S | 12/2006 | Hutton | |
| 7,487,953 | B2 | 2/2009 | Sauner et al. | |
| 7,748,126 | B2 * | 7/2010 | Lu | 33/286 |

* cited by examiner

*Primary Examiner* — Lee D Wilson
*Assistant Examiner* — Nirvana Deonauth

(57) ABSTRACT

The laser equipped lift pad device provides for exact lift pad placement below an automobile. The device's embedded lasers shine directly upwardly toward a given work surface, an auto. By projecting laser light upwardly, a technician need only view the laser lighted surface or object of the auto and locate the devices one time, then lift the auto without repeated bended, kneeling, and inspection. The device ensures worker safety with exact locating capability, as incorrect lift point engagements and possible auto shift or fall is negated. The device thereby also ensures against auto damage which can be caused by engaging improper lift points of the auto. In negating repeated kneeling and bending, the laser equipped lift pad device also saves labor time and prevents laborer injury. The device easily replaces existing lift pads via either the pair of mount holes or the mount shaft, depending upon the given lift.

9 Claims, 3 Drawing Sheets

LASER EQUIPPED LIFT PAD DEVICE

BACKGROUND OF THE INVENTION

In automobile repair, a lift is perhaps the most used tool. The pads of a lift must be arranged precisely beneath an auto to prevent damage to the auto and to ensure safety. Most lifts used have four pads. Typically, this procedure requires repetitive bending in checking each pad location, often several times each, to be certain of the pads' lifting points. For example, each lifting procedure may often require three to four checks per pad. An average automobile technician often lifts four cars per day, six days per week, fifty weeks per year. This equates to over ten-thousand times per year that a technician must typically bend to at least one knee. A device that would allow a technician to accurately place each pad only once could provide an amazing labor savings and also provide greater safety in ensuring that the pads are placed correctly. The present device provides these solutions.

FIELD OF THE INVENTION

The laser equipped lift pad device relates to automobile lifts and more especially to a replacement lift pad that provides laser lighting for exact pad location beneath an auto.

SUMMARY OF THE INVENTION

The general purpose of the laser equipped lift pad device, described subsequently in greater detail, is to provide a laser equipped lift pad device which has many novel features that result in an improved laser equipped lift pad device which is not anticipated, rendered obvious, suggested, or even implied by prior art, either alone or in combination thereof.

To attain this, the laser equipped lift pad device provides for exact lift pad placement below an automobile. When turned on via the on/off, the embedded lasers shine directly upwardly toward a given work surface, typically the bottom side of an auto. By projecting laser light upwardly, a technician need only view the laser lighted surface or object of the auto and locate the devices one time, then lift the auto without repeated bended, kneeling, and inspection. The device ensures worker safety with exact locating capability, as incorrect lift point engagements and possible auto shift or fall is negated. The device thereby also ensures against auto damage which can be caused by engaging improper lift points of the auto. In negating repeated kneeling and bending, the laser equipped lift pad device also saves labor time and prevents laborer injury. The device easily replaces existing lift pads via either the pair of mount holes or the mount shaft, depending upon the given lift. The sides of the device are provided in a variety of shapes.

Thus has been broadly outlined the more important features of the improved laser equipped lift pad device so that the detailed description thereof that follows may be better understood and in order that the present contribution to the art may be better appreciated.

An object of the laser equipped lift pad device is to provide for exact lift pad placement below an automobile.

Another object of the laser equipped lift pad device is to ensure worker safety.

A further object of the laser equipped lift pad device is to ensure against auto damage.

An added object of the laser equipped lift pad device is to save labor time.

And, an object of the laser equipped lift pad device is to prevent laborer injury.

A further object of the laser equipped lift pad device is to easily replace existing lift pads.

These together with additional objects, features and advantages of the improved laser equipped lift pad device will be readily apparent to those of ordinary skill in the art upon reading the following detailed description of presently preferred, but nonetheless illustrative, embodiments of the improved laser equipped lift pad device when taken in conjunction with the accompanying drawings.

DETAILED DESCRIPTION OF THE DRAWINGS

With reference now to the drawings, and in particular FIGS. 1 through 5 thereof, the principles and concepts of the laser equipped lift pad device generally designated by the reference number 10 will be described.

Figure 4:
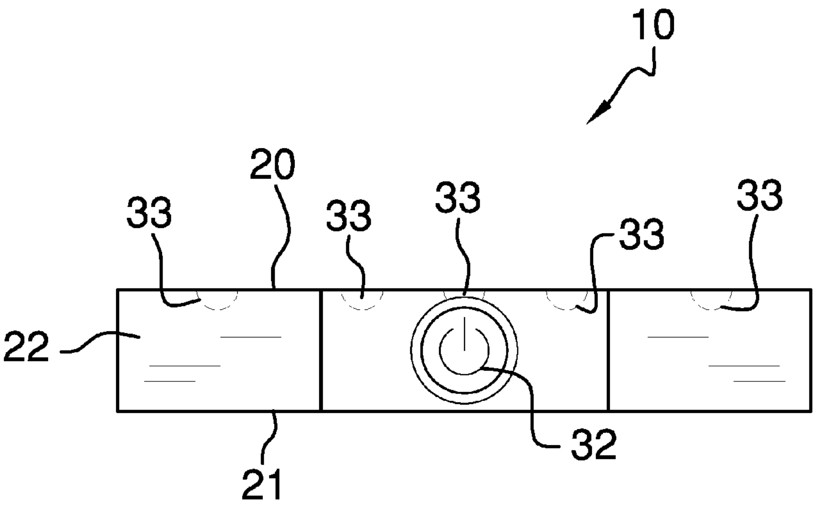
FIG. 4 is a lateral elevation view.

Referring to FIG. 4, the device 10 partially comprises a top 20 spaced apart from a bottom 21 by a circumferentially disposed side 22.

While the illustrated side 22 is octagonal, other shapes are provided and include but are not limited to hexagonal, circular, square and triangular. The top 20, the bottom 21, the sides 22, and there between are substantially comprised of a rubberized material.

Figure 5:
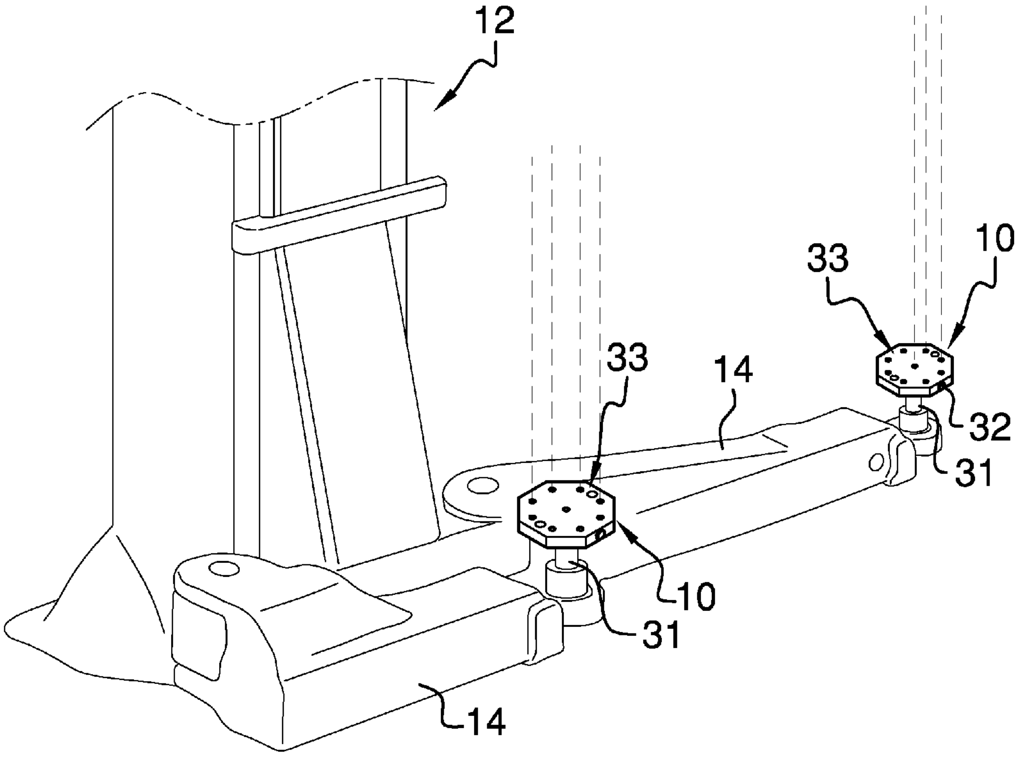
FIG. 5 is a perspective in-use view.

Referring to FIG. 5, the device 10 may further be provided with a metallic mount shaft 31 extended centrally and downwardly from the bottom 21. The mount shaft 31 may be required for fit to a given lift 12.

Figure 1:
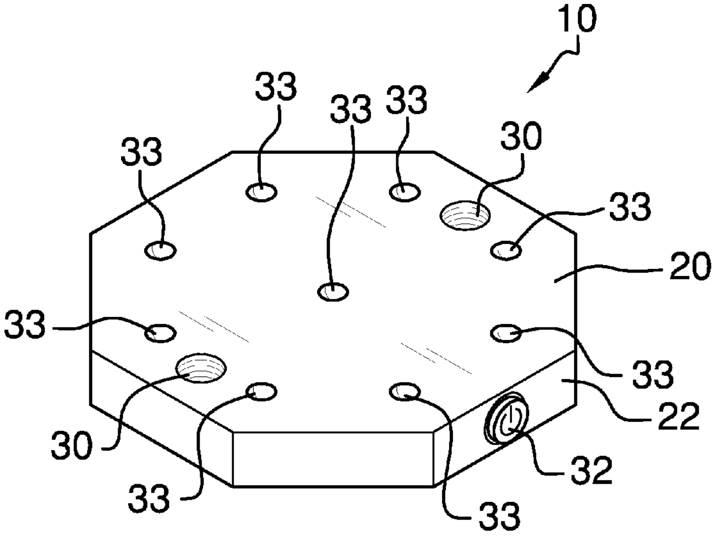
FIG. 1 is a top perspective view.

Referring to FIG. 1, the device 10 may further comprise a pair of spaced apart mount holes 30 disposed through the top 20 and the bottom 21. The mount holes 30 are threaded.

Figure 2:
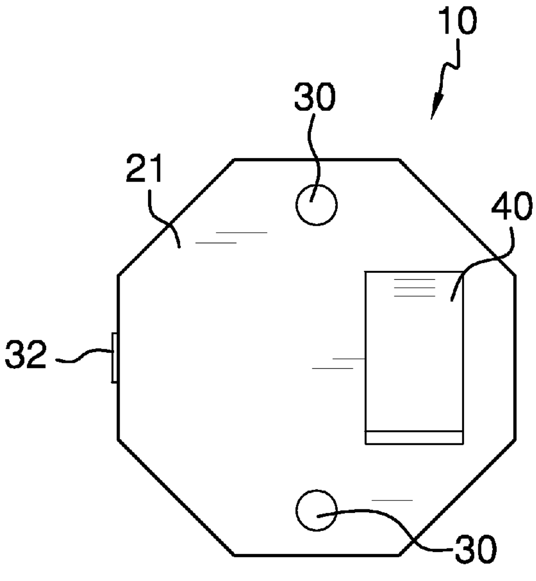
FIG. 2 is a bottom plan view.

Referring to FIG. 2, the battery pack 40 is removably disposed within the bottom 21.

Figure 3:
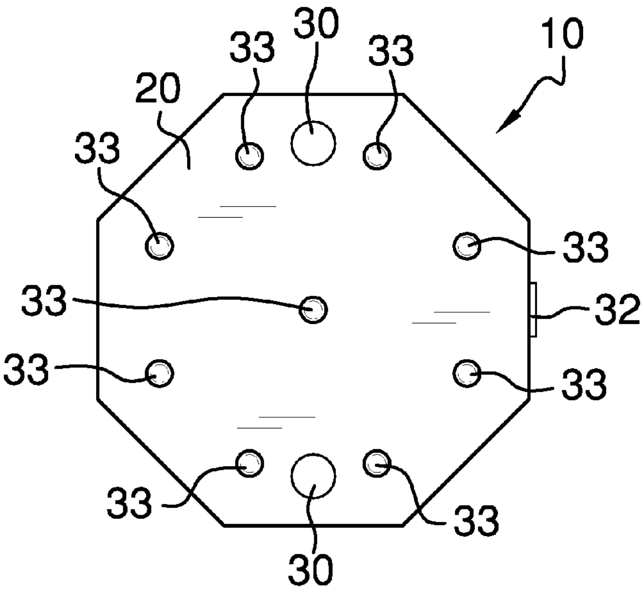
FIG. 3 is a top plan view.

Referring to FIG. 3, a plurality of spaced apart lasers 33 is embedded within the top 20. The lasers 33 are further disposed proximal to the side 22. An additional laser 33 is further disposed centrally.

Referring again to FIG. 4, the on/off 32 is disposed within the side 22. The on/off 32 is in communication with the battery pack 40 and the lasers 33.

Referring again to FIG. 5, a pair of the devices 10 is fitted to a pair of lift arms 14 of a lift 12. When an auto is positioned above the lift 12, the lasers 33 within the device 10 project onto the bottom of the auto and allow a technician to precisely position the lift arms 14 and the devices 10 below the exact lift points of the auto, without repetitive slight escalations of the lift 12 and without having to bend several times to check device 10 locations relative to the auto's lift points.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the laser equipped lift pad device may be used.

What is claimed is:

1. A laser equipped lift pad device comprising:

a top spaced apart from a bottom by a circumferentially disposed side; a pair of spaced apart mount holes disposed through the top and the bottom; a battery pack removably disposed within the bottom; a plurality of spaced apart lasers embedded within the top; an on/off switch disposed within the side, the on/off switch in communication with the battery pack and the lasers; wherein the side is further comprised of a variety of shapes.

2. A laser equipped lift pad device comprising:

a top spaced apart from a bottom by a circumferentially disposed side; a pair of spaced apart mount holes disposed through the top and the bottom; a battery pack removably disposed within the bottom; a plurality of spaced apart lasers embedded within the top; and an on/off switch disposed within the side, the on/off switch in communication with the battery pack and the lasers; wherein the pad device is further substantially comprised of a rubberized material; wherein the side is further comprised of a variety of shapes.

3. The device according to claim 1 wherein the lasers are further disposed proximal to the side.

4. The device according to claim 2 wherein the lasers are further disposed proximal to the side.

5. The device according to claim 3 wherein an additional laser is further disposed centrally.

6. The device according to claim 4 wherein an additional laser is further disposed centrally.

7. A laser equipped lift pad device comprising, in combination: a top spaced apart from a bottom by a circumferentially disposed side, the top, the bottom, the sides and there between substantially comprised of a rubberized material; a metallic mount shaft extended centrally and downwardly from the bottom; a battery pack removably disposed within the bottom; a plurality of spaced apart lasers embedded within the top; and an on/off switch disposed within the side, the on/off switch in communication with the battery pack and the lasers; wherein the side is further comprised of a variety of shapes.

8. The device according to claim 7 wherein the lasers are further disposed proximal to the side.

9. The device according to claim 7 wherein an additional laser is further disposed centrally.

* * * * *